Sept. 2, 1952          L. L. YOUNG          2,609,482

MEANS FOR WELDING THERMOPLASTIC SHEETS

Filed July 23, 1946          3 Sheets-Sheet 1

Inventor
Larry L. Young

By Samuel J. Snyder
Attorney

Sept. 2, 1952  L. L. YOUNG  2,609,482
MEANS FOR WELDING THERMOPLASTIC SHEETS
Filed July 23, 1946  3 Sheets-Sheet 2
FIG. 2  PRIOR ART
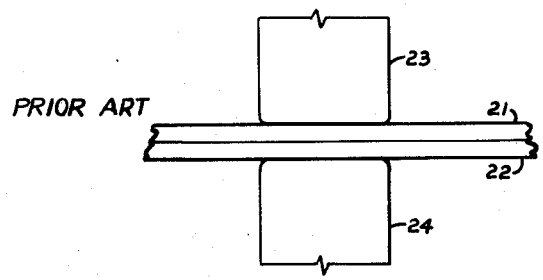
FIG. 3  PRIOR ART
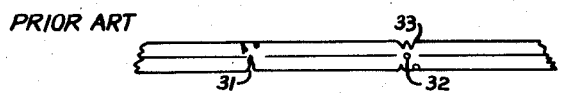
FIG. 4  PRIOR ART
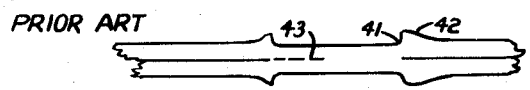
FIG. 5  PRIOR ART
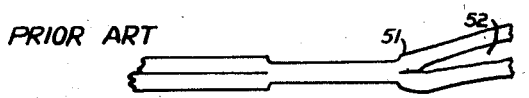
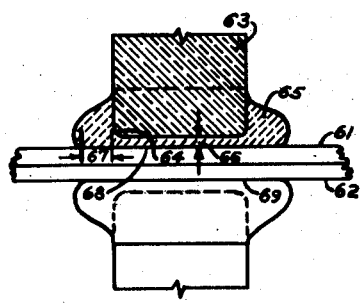
FIG. 6
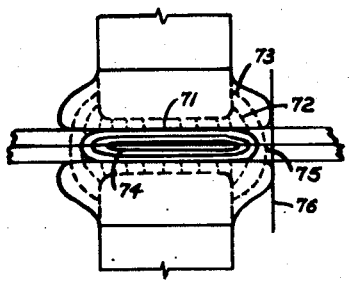
FIG. 7
INVENTOR.
Larry L. Young
BY
Samuel J. Snyder Sept. 2, 1952 L. L. YOUNG 2,609,482
MEANS FOR WELDING THERMOPLASTIC SHEETS
Filed July 23, 1946 3 Sheets-Sheet 3
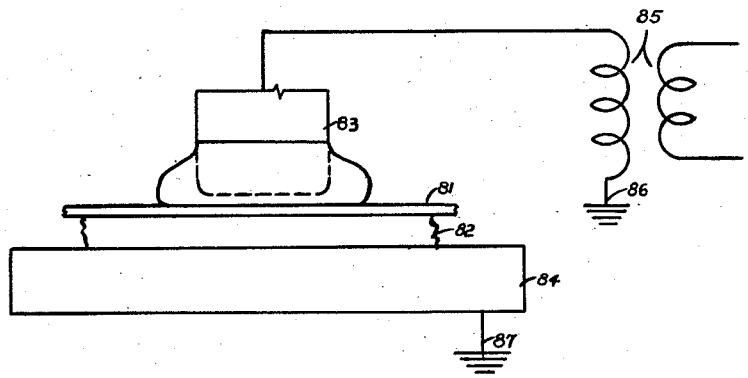
FIG. 8
FIG. 9
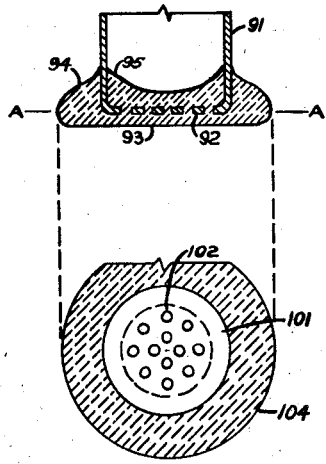
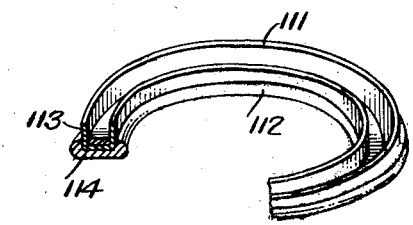
FIG. 11
FIG. 10
INVENTOR.
Larry L. Young
BY
Samuel J Snyder Patented Sept. 2, 1952

2,609,482

UNITED STATES PATENT OFFICE 2,609,482

MEANS FOR WELDING THERMOPLASTIC SHEETS

Larry L. Young, New York, N. Y., assignor, by mesne assignments, to Padevco, Inc., Washington, D. C., a corporation of Delaware Application July 23, 1946, Serial No. 685,647

9 Claims. (Cl. 219—47)

1

This invention relates to the art of welding thermoplastic materials using high frequency dielectric heating.

Thermoplastic materials in the form of sheets or plates have been laminated or welded together by pressing them between platens which can be heated and then cooled. In this case the thermoplastic sandwich becomes heated to plasticity by the flow of heat from the platens. The material is then cooled by the flow of heat back into the cooled platens. In this conventional method, the amount of heat exchanged in one heating and cooling cycle may be great because the heat capacity of the platen may be much greater than that of the thermoplastic sheet. As a result, conventional methods are wasteful of power, and a cycle of operation is objectionably slow.

In dielectric heating by high frequency displacement current, heat is generated within the thermoplastic material. This phenomenon makes it feasible to obtain temperature distribution, heating times, efficiency, and other specific results which are impossible to obtain wtih conventional means and methods.

The most simple arrangement is to press the sandwich sheets together between metal electrodes which restrain the material and produce the required high frequency field in the sheets. With such simple means, however, heat can flow by conduction into the metal electrodes at a rate which prevents the sheet interfaces from reaching a sufficiently high temperature until the electrodes also reach an elevated temperature. The rate of heat generation may be increased by increasing the potential gradient through the sheets or by increasing the alternating frequency. There are practical limitations of increasing frequency as pointed out by G. W. Scott, Jr., "The Role of Frequency in Industrial Dielectric Heating," Technical Paper A. I. E. E. 45-106, June 1945.

As the potential is increased between the simple electrodes, there is a region of the sandwich just protruding from the electrodes where heat flow by conduction is small and the region reaches excessive temperatures which results in thermal and electrical breakdown.

The invention herein discloses means and methods of eliminating the difficulties and limitations encountered in the prior art.

The prime object is to affect a welding of the sheets.

Another object is to weld together a specific area of the interface between two sheets without causing an overall warping or distortion of the sheets.

Another object is to weld an area of the interface of two sheets without causing a local deformation or extrusion at the weld which might be objectionable in appearance or which might result in a weakened structure.

Another object is to provide a method of welding thermoplastic sheets which is rapid and convenient.

Another object is to provide means which are simple, inexpensive, and which will withstand much usage.

Another object is to provide a means and method which is economical in the use of power.

Another object is to provide a means and method of welding together thin sheets of thermoplastic material.

Another object is to provide a means and method capable of welding together sheets of thermoplastic material which, because of their thinness, low loss factor or high temperature of plasticity, have been difficult or impossible to weld by similar means and methods heretofore attempted.

The invention will be fully understood by reference to the following description and drawings in which:

Figure 2 shows an arrangment of conventional electrodes in position to weld two thermoplastic sheets.

Figure 3 shows one kind of unsatisfactory weld obtained with conventional electrodes characterized by electrical and thermal breakdown at electrode edge.

Figure 4 shows another form of unsatisfactory weld obtained with conventional electrodes characterized by local deformation and extrusion.

Figure 5 shows an unsatisfactory weld obtained with conventional electrodes in which deformation and extrusion combined with a bending and separation of the sheets has occurred.

Figure 6 shows a pair of electrodes according to my invention with the cross-section of one shown in detail.

Figure 7 is a section through the electrodes and thermoplastic sandwich showing lines of electric flux and regions of temperature rise.

Figure 8 shows a single electrode of the invention in an assymetric arrangement for welding a thin thermoplastic sheet of a thick sheet.

Figure 9 shows in cross-section a modification of the detail structure of an electrode.

Figure 10 shows another cross-section view of the modified electrode of Figure 9.

Figure 11 shows a ring-shaped electrode constructed in accordance with the invention.

Figure 1:
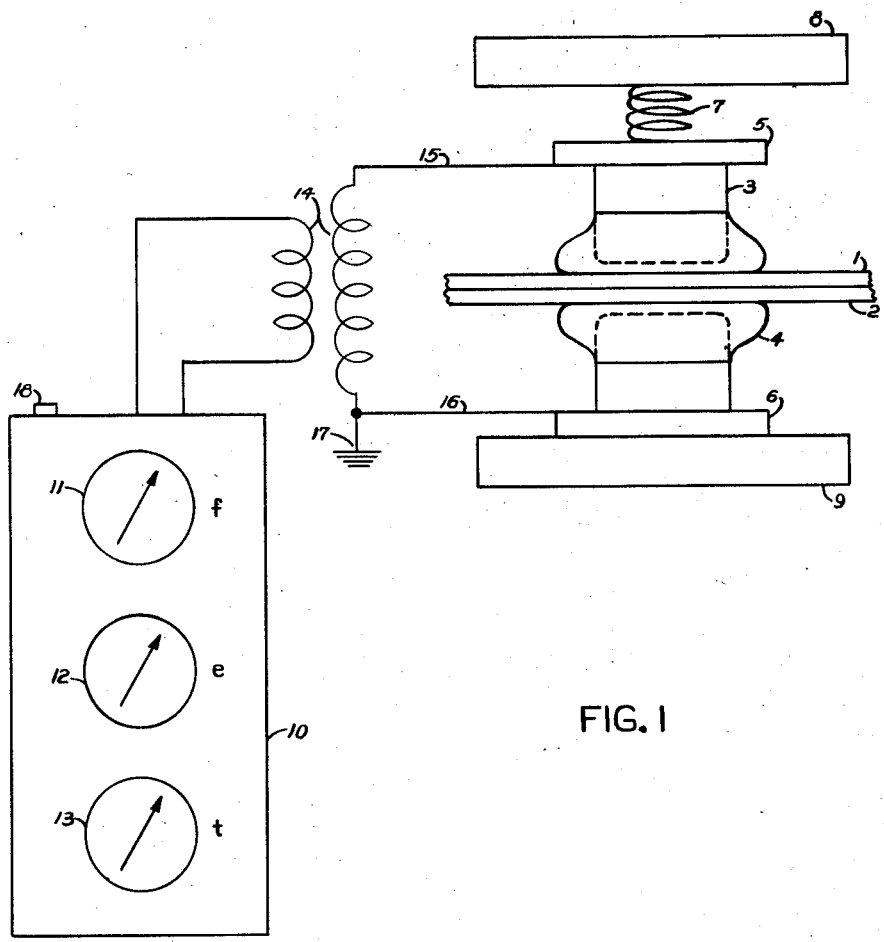
Figure 1 shows a schematic arrangement of electrodes pressed against thermoplastic sheets and coupled to a source of high-frequency power.

In Figure 1, 1 and 2 are sheets of thermoplastic material pressed between electrodes 3 and 4. 5 and 6 are electrical insulators which insulate the electrodes from the fixed members 8 and 9. A spring member 7 maintains pressure on the thermoplastic sheets 1 and 2. An oscillator 10 provided with controls 11, 12, and 13, which determine frequency $f$ and voltage $e$ applied for a short period of time $t$ to the electrodes through coupling 14 and leads 15 and 16. 17 represents a ground for the lower electrode. 18 is a starting button.

The method of using these means to make a weld in the thermoplastic sheets is as follows:

With the sheets 1 and 2 in place and controls 11, 12, and 13 properly set, the starting button 18 is pressed. A pulse of predetermined frequency and voltage is thereupon automatically applied to the electrodes. The powder is automatically turned off after a short period of time $t$ determined by the setting of 13. Compressing the spring member 7 and moving the welded sheets completes one welding cycle.

An important feature of the invention is the structure of the electrodes. In order to point out the features of my invention, a conventional electrode and results obtained therewith will first be described.

In Figure 2, 21 and 22 are two thermoplastic sheets pressed between metal electrodes 23 and 24 to which a pulse of high frequency potential is applied as in the method decribed above. With low power and pulses of short duration, there is negligible effect on the thermoplastic and little tendency to weld.

Figure 3 illustrates an unsatisfactory weld showing charred perforations 31, bubbles 32, and scorched spots 33 at the line where the plastic sheets extend from the electrodes.

Figure 4 shows a weld which was obtained at a lower power but with power applied for a long time. The sheets show objectionable plastic deformation 41 and extrusion 42. The interface may be poorly bonded at 43.

Figure 5 shows in addition to the faults shown in Figure 4, a bending 51 and spreading 52 of the sheet beyond the weld line.

The applicant has ascertained through analysis and experiment that heat flow in and near the weld area of the thermoplastic sheets and in the electrodes which indirectly produce the high frequency displacement currents in the sheets and which press against the thermoplastic sheets is an important factor. This heat flow depends on the thermal conducivity of the materials of the electrode and the thermoplastic sheets, on the geometry of the electrode and sheets, on the temperature distribution in the electrode and sheets at any instant. Stated more completely: In order to produce a certain favorable temperature distribution in the thermoplastic sheets which will enable one to obtain the above-named objectives, it is necessary to employ electrodes which yield proper heat flow and electrical functioning, and to apply a certain potential of certain high frequency and for a certain period of time to these electrodes.

Referring to Figure 6, thermoplastic sheets 61 and 62 are shown in position to be welded between two electrodes. A sectional view of the upper electrode shows a good electrical conductor 63 such as copper, silver or Kovar. The rounded end of the conductor 64 has bonded to it a dielectric material such as glass which separates the conductor from the thermoplastic by a distance 66 of a few thousandths of an inch and which extends beyond the edge of the conductor a distance 67. The face 68 of the composite electrode which presses against the thermoplastic sheet is smooth and flat (for welding flat sheets) and makes positive contact with the thermoplastic sheet over the entire end surface.

The dielectric portion 65 of the electrode is a material selected for its low thermal conductivity. It must also have the following additional characteristics:

1. Non-conductor of electricity.
2. Poor thermal conductor.
3. High dielectric constant.
4. Low power factor at high frequency.
5. Low loss factor at high frequency.
6. High dielectric strength.
7. High mechanical strength.
8. Must withstand sudden changes in temperature such as between 0° and 250° Centigrade without damage.
9. Non-porous.
10. Smooth finished.

The specific values for one embodiment of applicant's invention were as follows:

Plastic material—Cellulose acetate .010 thick.
Electrodes—Glass-Kovar (circular section); Kovar 0.30″ diameter; glass 0.450″ diameter, 0.020″ thickness on flat end.
Seal area—0.30″ diameter.
Frequency—40 megacycles per second.
Potential on electrodes—3000 volts.
Time—0.20 second.
Instantaneous power dissipated 80 watts.

The welding operation is as follows:

The electrodes press the sheets together and determine the configuration of alternating high frequency flux through the thermoplastic. The electrodes being in contact with the sheets also determine the heat flow conditions.

The potential applied to the electrodes determines the flux density and potential gradient in the thermoplastic and therefore affects the volumetric rate of heat generation. The frequency of oscillation of the currents also affects the rate of heating. Other factors affecting the heating are the nature and condition of the thermoplastic material.

The temperature rise at any particular point in the thermoplastic sandwich depends on rate of heat generation, on heat flow, on the nature and condition of the thermoplastic material, and on the heating time.

Using the means and method shown, a high degree of control over these factors is obtained.

In Figure 7 lines of electric flux 71, 72 and 73 between the electrodes are represented. In the arrangement shown, the flux density at a point in the thermoplastic such as 74 will be greater than in the region 75 under the edge of the electrode. It is established that the volumetric rate of heat generation is proportional to the square of the electric flux density.

An important feature of the electrode is the thermal insulating function of the dielectric part of the electrode underlying the end of the electrical conductor above and below the region 74. In the arrangement shown, the thermal insulation of the region 74 is high and the thermal insulation of the adjacent region 75 is not much higher.

An important advantage of the electrode arrangement shown is that by surrounding the end of the electrical conductor with dielectric material, the potential gradient in region 74 is highly uniform and there is no point in the thermoplastic material which is subjected to an appreciably greater potential gradient. Also the extended dielectric portion 65 which presses against the thermoplastic absorbs heat energy from the thermoplastic and so prevents it from reaching excessive temperatures.

The extended dielectric portion of the electrode maintains sufficient pressure on the region 75 so that this portion, which does not reach a temperature sufficient for plasticity, remains tightly wedged between the electrodes and serves as a pressure dam to confine the plastic region 74. In this manner considerable pressure can be obtained in region 74 which pressure is necessary to affect a high quality bond. Thus, the regions 75 in combination with the electrodes form a mold, in effect, for the region 74, and any thermoplastic which can be molded at suitable pressure and temperatures can be welded in the manner shown.

A feature of this method of welding is that the thermoplastic sheets do not reach a high temperature at the edge of the electrodes; welds can therefore be obtained without distorting or warping the sheets and without causing a local deformation or extrusion at or near the weld.

An important feature of this method is based on the fact that the heat flow phenomenon is critically dependent on the element of time. Heat is generated in the thermoplastic region 74 at a rate sufficient to cause the temperature of this region to rise rapidly in spite of the flow of heat energy from this region. This requires a high potential gradient through the thermoplastic, but the weld may be accomplished in only a small fraction of a second.

An important feature of this method is that by producing larger displacement currents for a limited time, the heat developed raises the temperature of the region 74 efficiently and only a small fraction of the heat developed is wasted. Therefore, the amount of heat energy which flows into the electrodes during a welding cycle is small and the electrodes remain cool. The structure of the electrodes is such that heat flows out of the region 74 rapidly only after the welding temperature has been reached and the high frequency power has been shut off. This permits extremely rapid welding. Since the heat loss is low, only low power required and small and inexpensive high frequency generating equipment is required.

As an example of the versatility of the method, reference is made to Figure 8 in which 81 is a thin thermoplastic sheet, 82 is a thick thermoplastic sheet, 83 is an electrode, and 84 is a thick electrically conducting sheet of large surface area. 85 represents a high frequency coupling, 86 a ground connection, and 87 a ground connection to the large conductor representing means for putting the electrode at a high frequency potential relative to the large conductor when high frequency power is supplied to the coupling 85.

The object of this arrangement is to weld the region of the interface between the thin and thick sheet without causing any of the faults of deformation or extrusion.

Figure 9 shows a variation in the detail construction of the electrodes. The cross-section in a plane perpendicular to the face of the electrode shows a thin metallic conducting shell in the form of a U, 91, the bottom of which may be perforated 92. Dielectric material is bonded to the conductor as shown to form a face 93, a projecting edge 94, and an internally supporting structure 95. This construction is utilized to provide a greater control of heat flow and an improved mechanical structure.

Figure 10 shows a cross-section of the electrode of Figure 9 taken along the line A—A in Figure 9. 91 is the shell, 92 are the perforations in the shell, and 94 is the dielectric forming the projecting edge of the electrode.

Figure 11 shows means for making a weld of large area in the form of a closed ring in one welding cycle. 111 is a metal channel and 112 is the dielectric face edge. 113 and 114 are the conducting channel and dielectric revealed in cross-section.

Whereas the description and drawings have in the main described electrodes which may be used for spot-welding a small area of the interface of two sheets and which may be used to form overlapping welds to form a line weld, I do not wish to be so restricted, the scope of my invention being defined by the claims.

I claim:

1. An electrode for high frequency dielectric heating comprising a metallic member having a flat side, a thin coating of low loss dielectric material having a low thermal conductivity on said side, and a bead of said material of arcuate cross section round the periphery of said side and integral with said coating, said coating having a thickness of less than .05 inch, and said bead a thickness at least several times that of said coating.

2. High frequency dielectric heating apparatus including a high frequency generator, a pair of electrodes connected to the high frequency generator, one of said electrodes comprising a metallic member having a flat side, a thin coating of low loss dielectric material having a low thermal conductivity on said side, and a bead of said material of arcuate cross section round the periphery of said side and integral with said coating, said coating having a thickness of less than .05 inch, and said bead a thickness at least several times that of said coating.

3. High frequency dielectric heating apparatus for welding sheets of thermoplastic material including a high frequency generator, a pair of electrodes juxtaposed on opposite sides of the thermoplastic sheets, means for holding said electrodes against said thermoplastic sheets under pressure, each of said electrodes comprising a metallic member having a flat side, a thin coating of low loss dielectric material having a low thermal conductivity on said side, and a bead of said material of arcuate cross section round the periphery of said side and integral with said coating, said coating having a thickness of less than .05 inch, and said bead a thickness at least several times that of said coating.

4. An electrode for high frequency dielectric heating comprising a hollow metallic cylinder, one end of said cylinder having perforations, a low loss dielectric material having low thermal conductivity forming a continuous, plane, thin coating over the perforated end of the metallic cylinder and extending through said perforations to within said cylinder.

5. The electrode described in claim 4 in which the metallic cylinder is Kovar and the dielectric material is glass.

6. High frequency heating apparatus for thin thermoplastic sheet comprising, a source of high frequency voltage, a pair of electrodes connected to said source of high frequency voltage, at least one of said electrodes comprising a metallic body having a flat face, a dielectric material having low thermal conductivity and low dielectric loss in response to said voltage forming a coating over said face, said coating having a thickness of less than .05 inch, a bead of said dielectric material of arcuate cross section averaging at least two times said thickness about the periphery of said face and integral with said coating, means for compressing said sheet between said electrodes, means for applying said high frequency voltage to said electrodes in a short pulse, said pulse enduring for a time only sufficient to effect softening of said sheet without substantial heating of said at least one electrode by flow of heat from said sheet to said at least one electrode via said coating, and means for maintaining pressure of said electrodes on said sheets after termination of said pulse until heat has flowed from said sheet to said one of said electrodes via said coating in sufficient quantity to enable solidifying of said sheet.

7. An electrode structure for high frequency dielectric heating, comprising, a hollow electrode having a flat electrode surface, said electrode surface having at least one aperture therein, said electrode surface fabricated of Kovar, and a thin coating of glass secured to said electrode surface and extending into said hollow electrode via said at least one aperture.

8. High frequency heating apparatus for thin thermoplastic sheets, comprising, a source of high frequency voltage, a pair of electrodes connected to said source of high frequency voltage, said electrodes comprising parallel faces, at least one of said faces comprising metal coated with dielectric material having low thermal conductivity and low dielectric losses in response to said voltage, means for compressing said sheets between said faces, means for applying said high frequency voltage to said electrodes in a short pulse, said pulse enduring for a time only sufficient to effect flow of said sheets without substantial heating of said electrodes by flow of heat from said sheets to said electrodes via said coating, and means for maintaining pressure of said electrodes on said sheets after termination of said pulse until heat has flowed from said sheet to said one of said electrodes via said coating in sufficient quantity to enable solidifying of said sheet.

9. High frequency heating apparatus for thermoplastic sheets, comprising, a source of high frequency voltage, a pair of electrodes connected to said source of high frequency voltage, said electrodes comprising parallel faces, at least one of said electrodes having relatively low thermal conductivity and low dielectric loss in response to said voltage, means for compressing said sheets between said faces, means for applying said high frequency voltage to said electrodes in a short pulse, said pulse enduring for a time only sufficient to effect softening of said sheets without substantial heating of said at least one of said electrodes by flow of heat from said sheets to said at least one of said electrodes, and means for maintaining pressure of said electrodes on said sheets after termination of said pulse until heat has flowed from said sheet to said at least one of said electrodes in sufficient quantity to enable cooling of said sheet below softening temperature.

LARRY L. YOUNG.

REFERENCES CITED

The following references are of record in the file of this patent:

UNITED STATES PATENTS

| Number | Name | Date |
|---|---|---|
| 2,154,261 | Brandt | Apr. 11, 1939 |
| 2,231,457 | Stephen | Feb. 11, 1941 |
| 2,233,176 | Melton et al. | Feb. 25, 1941 |
| 2,280,771 | Dufour et al. | Apr. 28, 1942 |
| 2,341,617 | Hull | Feb. 15, 1944 |
| 2,354,714 | Strickland | Aug. 1, 1944 |
| 2,401,991 | Walton et al. | June 11, 1946 |
| 2,404,191 | Quayle et al. | July 16, 1946 |
| 2,407,833 | Jablonsky | Sept. 17, 1946 |
| 2,411,254 | Frank | Nov. 19, 1946 |
| 2,423,902 | Peterson | July 15, 1947 |
| 2,463,054 | Quayle et al. | Mar. 1, 1949 |
| 2,514,184 | Lower | July 4, 1950 |
| 2,521,797 | Klingamen | Sept. 12, 1950 |
| 2,526,697 | Scott, Jr. | Oct. 24, 1950 |
| 2,542,589 | Stanton et al. | Feb. 20, 1951 |
| 2,551,402 | Vinson | May 1, 1951 |
| 2,565,161 | Wilmotte et al. | Aug. 21, 1951 |

FOREIGN PATENTS

| Number | Country | Date |
|---|---|---|
| 118,453 | Australia | Apr. 26, 1944 |
| 393,491 | Great Britain | June 8, 1933 |
| 573,518 | Great Britain | Nov. 23, 1945 |

OTHER REFERENCES

Radio-Frequency Heating Equipment, by L. L. Langton, Pitman Publishing Corp., New York, N. Y. (published 1948). (Copy in Div. 60.)